United States Patent
Li

(10) Patent No.: US 9,739,472 B1
(45) Date of Patent: Aug. 22, 2017

(54) DIMMABLE AND COLOR TEMPERATURE ADJUSTABLE LED LAMP WITH BLUETOOTH AUDIO PLAYBACK FUNCTION

(71) Applicant: DongGuan City General Success Industrial Co.LTD, DongGuan (CN)

(72) Inventor: Ming Li, DongGuan (CN)

(73) Assignee: DONGGUAN CITY GENERAL SUCCESS INDUSTRIAL CO.LTD, Dongguan (CN)

( * ) Notice: Subject to any disclaimer, the term of this patent is extended or adjusted under 35 U.S.C. 154(b) by 0 days.

(21) Appl. No.: 15/169,357

(22) Filed: May 31, 2016

(30) Foreign Application Priority Data

Apr. 28, 2016 (CN) .................... 2016 2 0369575 U

(51) Int. Cl.
| | |
|---|---|
| *F21V 33/00* | (2006.01) |
| *F21V 23/00* | (2015.01) |
| *F21S 8/06* | (2006.01) |
| *F21V 23/04* | (2006.01) |
| *F21V 23/06* | (2006.01) |
| *F21V 29/83* | (2015.01) |
| *F21V 29/70* | (2015.01) |
| *F21V 3/00* | (2015.01) |
| *H04R 1/02* | (2006.01) |

(Continued)

(52) U.S. Cl.
CPC .......... *F21V 33/0056* (2013.01); *F21S 8/061* (2013.01); *F21S 8/063* (2013.01); *F21V 3/00* (2013.01); *F21V 23/001* (2013.01); *F21V 23/006* (2013.01); *F21V 23/045* (2013.01); *F21V 23/06* (2013.01); *F21V 29/70* (2015.01); *F21V 29/83* (2015.01); *G06F 3/165* (2013.01); *H04R 1/026* (2013.01); *H04R 1/028* (2013.01); *F21Y 2101/02* (2013.01); *F21Y 2103/022* (2013.01); *H04R 2201/028* (2013.01); *H04R 2420/07* (2013.01)

(58) Field of Classification Search
CPC ...... F21V 33/0056; F21V 29/70; F21V 29/83; F21V 3/00; F21V 23/001; F21V 23/006; F21V 23/045; F21V 23/06; F21S 8/061; F21S 8/063; G06F 3/165; H04R 1/026; H04R 1/028; H04R 2201/028; H04R 2420/07; F21Y 2101/02; F21Y 2103/022
USPC ............................................ 381/79, 333, 82
See application file for complete search history.

(56) References Cited

U.S. PATENT DOCUMENTS

| | | | |
|---|---|---|---|
| 2014/0177901 A1* | 6/2014 | Berkman | H04R 1/021 381/391 |
| 2015/0153037 A1* | 6/2015 | Lee | F21V 33/0056 381/334 |
| 2016/0061438 A1* | 3/2016 | Lu | F21V 33/0056 362/86 |

* cited by examiner

*Primary Examiner* — Vivian Chin
*Assistant Examiner* — Douglas Suthers
(74) *Attorney, Agent, or Firm* — Ming Chow; Sinorica, LLC

(57) ABSTRACT

A dimmable and color temperature adjustable LED lamp with Bluetooth audio playback function includes a ceiling plate, an LED light source component connected to a lamp cover and a support plate and formed by an LED panel and a driver for supplying low voltage power, and a driving circuit having an input power line, a high voltage input module, a control module, a diming module, a color temperature adjusting module, a transformer module, a low voltage output module and an output power line. The ceiling plate and the support plate are connected by a suspension part, and the lower end of the suspension part is fixed to a (Continued)

Bluetooth amplifier. The LED lamp has a Bluetooth amplifier to improve the overall surround sound quality for music playback.

10 Claims, 7 Drawing Sheets

(51) Int. Cl.
*G06F 3/16* (2006.01)
*F21Y 101/02* (2006.01)
*F21Y 103/02* (2006.01)

DIMMABLE AND COLOR TEMPERATURE ADJUSTABLE LED LAMP WITH BLUETOOTH AUDIO PLAYBACK FUNCTION

The current application claims a foreign priority to application number 201620369575.5 filed on Apr. 28, 2016 in China.

FIELD OF THE INVENTION

The present invention relates to a light emitting diode (LED) illumination, and more particularly to a dimmable and color temperature adjustable LED lamp with Bluetooth audio playback function.

BACKGROUND OF THE INVENTION

Most conventional semi-flush ceiling lamps, pendant lamps or multiple-head ceiling lamps have a single function. Particularly, export lamps generally come with an ON/OFF switch for controlling the illumination of the lamp, and the old-fashioned lamps have a circuit control board with a RC buck design or high voltage lamp beads provided for controlling the illumination of the lamp directly by a chip.

However, the conventional LED lamps have the following drawbacks:

1. Single function fails to meet different consumer requirements and lacks of market competitiveness.
2. The monochromatic LED lamps just provide simple dimming function only.
3. The switch structure is controlled via cable, so that the control lacks of flexibility and a free switch of control cannot be achieved.
4. The conventional LED lamps do not have the music playback function. If it is necessary to play music, an additional independent amplifier will be required, not just increasing the occupying space only, but also incurring a higher cost.

SUMMARY OF THE INVENTION

Therefore, it is a primary objective of the present invention to overcome the aforementioned drawbacks by providing a dimmable and color temperature adjustable LED lamp with Bluetooth audio playback function, and the LED lamp is capable of dimming light and adjusting color temperature as well as playing music through a cable connection.

To achieve the aforementioned and other objectives, the present invention provides a dimmable and color temperature adjustable LED lamp with Bluetooth audio playback function, comprising a ceiling plate and an LED light source component coupled to the ceiling plate, and the LED light source component is coupled to a lamp cover and a support plate, and the LED light source component is consisted of an LED panel and a driver for supplying a low voltage power to the LED panel, and the LED panel comprises double color temperature LED lamp beads, and the driver comprises a driving casing and a driving circuit board installed in the driving casing, and the driving circuit board comprise an input power cord, a high voltage input module, a control module, a dimming module, a color temperature adjusting module, a transformer module, a low voltage output module and an output power line, wherein the high voltage input module is coupled to the input power cord and the control module, and the control module is coupled to the dimming module and the color temperature adjusting module and provided for controlling the illumination brightness and the color temperature change of the double color temperature LED lamp beads, and the transformer module is coupled to the control module and the low voltage output module, and the output power line is coupled to the low voltage output module; and the high voltage power is passed to the high voltage input module through the input power cord, and the magnitude of the input voltage is adjusted by the control module, and then the high voltage power is converted into a safe low voltage power by the transformer module, and the safe low voltage power is outputted by the low voltage output module, and finally the low voltage power is sent to the LED panel through the output power line.

A suspension part is provided for coupling the ceiling plate and the support plate, and a Bluetooth amplifier is installed and fixed to a lower end of the suspension part, and a positioning rod is installed at a lower end of the suspension part, and the Bluetooth amplifier has a longitudinal mounting hole formed thereon and penetrated through the Bluetooth amplifier, and the positioning rod is passed through the longitudinal mounting hole and fixed and coupled to the support plate, and the top of the positioning rod has a pressing member for pressing the top of the Bluetooth amplifier, so that the Bluetooth amplifier is pressed and fixed to the top of the support plate closely.

Preferably, the Bluetooth amplifier comprises an amplifier casing, a drive power, a Bluetooth control board and a speaker, and the longitudinal mounting hole is formed at the middle of the amplifier casing, and the speaker is installed on a lateral side of the amplifier casing.

Preferably, the amplifier casing further comprises a casing cover fixed by a screw and covered onto a lateral side of the amplifier casing, and a diaphragm installed at the middle of the casing cover for enhancing a bass effect.

Preferably, the control module is a wireless control module, and the LED lamp further comprises an independent wireless remote control for matching and controlling the wireless remote control via a wireless connection. After the LED lamp is switched and powered on, the dimming module is matched with a remote control of the LED lamp to provide normal operation and use.

Preferably, an end of the output power line of the driver has a male connector, and the LED panel has a female connector matched and coupled with the male connector, and the male connector and the female connector are designed with a matched wiring to simplify the assembling process that uses terminals for wiring, and such design not just saving labor cost only, but also providing a better appearance of the circuit board.

Preferably, the support plate is a circular structure, and the bottom surface of the support plate is a flat and smooth surface, and both LED panel and driver are installed onto the bottom surface of the support plate, and the LED panel is composed of more than two arc LED strips, and the double color temperature LED lamp beads are installed onto the bottom surface of each LED strip, and the LED strip is wound to form a circular shape, and the driver is disposed at the center of the circular LED strip. The LED strip is wound into a circular shape, not just increasing the light emitting area only, but also saving cost and overcoming the drawback of having a hidden dark area on the light emitting surface, and the driver is disposed at the center of the circular LED strip to reduce the height of the ceiling plate effectively, not just providing a better appearance only, but also saving the packaging material for manufacturers and the transportation cost for consumers.

Preferably, the support plate has a vertically and downwardly extended installing pillar installed at the middle of the support plate and passed into the center of the driver, and the lamp cover is an arc disc-shaped structure with an upward opening, and the installing pillar is passed into the center of the lamp cover, and a decorative cover is installed at the bottom of the installing pillar for fixing the lamp cover.

Preferably, the lamp cover is a disc structure with a downward opening, and the middle of the top portion of the lamp cover is protruded to form an accommodating chamber with an downward opening, and a vertically and downwardly extended installing pillar is installed at the center of the top of the accommodating chamber, and the driver is passed into the installing pillar and fixed in the accommodating chamber, and the LED panel is a circular disc shaped structure, and the double color temperature LED lamp beads are installed at the bottom surface of the LED panel, and the LED panel is passed into the installing pillar and fixed to the bottom of the driver, and the LED panel is disposed at the opening of the accommodating chamber.

Preferably, the accommodating chamber has a plurality of air convection holes formed at the top edge of the accommodating chamber, a cooling plate installed between the driver and the LED panel and passed into the installing pillar, and a light shield installed under the LED panel, passed into the installing pillar, and fixed by a fastener. The air convection hole is formed directly at the top of the driver, and the structure is designed with a reasonable size to match the cooling plate, so as to overcome the heat dissipation problem of the LED effectively and prevent abnormal situations (such as dead light, etc) due to the heat dissipation problem of the LED.

Preferably, the support plate is a circular structure, and the bottom surface of the support plate is a flat and smooth surface, and the driver is fixed and installed to the bottom surface of the support plate, and a junction box is disposed at the bottom surface of the support plate for covering the cover of the driver, and the support plate is coupled to more than two bent supported rods, and the support rod has an end fixed to the support plate and the other end having a lamp cup, a lamp cover and a vertically and upwardly extended installing pillar, and the lamp cover is a structure with an upward opening, and the installing pillar is disposed at the centre of the lamp cover, and the LED panel is a circular disc shaped structure, and the double color temperature LED lamp beads are uniformly installed to the top of the LED panel, and the LED panel is passed into the installing pillar, and a light shield is installed at the top of the LED panel and a cooling plate is installed at the bottom of the LED panel and passed into the installing pillar.

The light shield is disposed at the bottom of the LED panel, and the light shield is a transparent structure, not just capable of protecting the LED panel only, but also capable of preventing strong light from stimulating users' eyes and providing a good appearance of the LED lamp.

Therefore, the present invention has the following advantages and effects:

1. The LED lamp has a Bluetooth amplifier, and the LED lamp is a ceiling lamp or a semi-ceiling lamp installed at the top of a room, so that when the Bluetooth amplifier plays music, the overall surround sound effect is better than the effect of putting the lamp on a desk or table.

2. During use, the LED lamp is powered on, and a mobile phone is connected to a Bluetooth option to match the Bluetooth amplifier automatically, and the mobile phone is operated to play music automatically in a simple and convenient way.

3. The LED lamp of the present invention has diversified functions including the dimming function, the color temperature adjusting function, and the Bluetooth playback function of the mobile phone, and the LED lamp has the features of high light emitting efficiency and high color rendering index, and the same model of lamps can meet different users' requirements.

4. The mobile phone is used for Bluetooth music playback, and the wireless remote control is used for adjusting the color temperature and the brightness of the LED lamp to facilitate users to control the LED lamps at any position within the effective range of a room.

5. The high voltage input module, the transformer module and the low voltage output module are used to achieve high voltage input and low voltage output and to assure safety. In addition, the same model of LED lamps combines three functions of dimming, adjusting color temperature, and playing music playback into one, so that users may switch to their desired function as needed, and such arrangement not just saving electricity cost only, but also improving the market competitiveness.

Wherein, 1 is a ceiling plate, 2 is a support plate, 3 is a lamp cover, 4 is a driver, 5 is an LED panel, 6 is a wireless remote control, 7 is a suspension part, 8 is a Bluetooth amplifier, 9 is an installing pillar, 10 is a decorative cover, 11 is a decorative head, 12 is a cooling plate, 13 is a light shield, 14 is a junction box cover, 15 is a support rod, 16 is a lamp cup, 801 is an amplifier casing, 802 is a drive power, 803 is a Bluetooth control board, 804 is a speaker, 805 is a casing cover, and 806 is a diaphragm.

DESCRIPTION OF THE PREFERRED EMBODIMENTS

The aforementioned and other objectives and advantages of this disclosure will become clearer in light of the following detailed description of an illustrative embodiment of this invention described in connection with the drawings.

Embodiment 1

Figure 1:
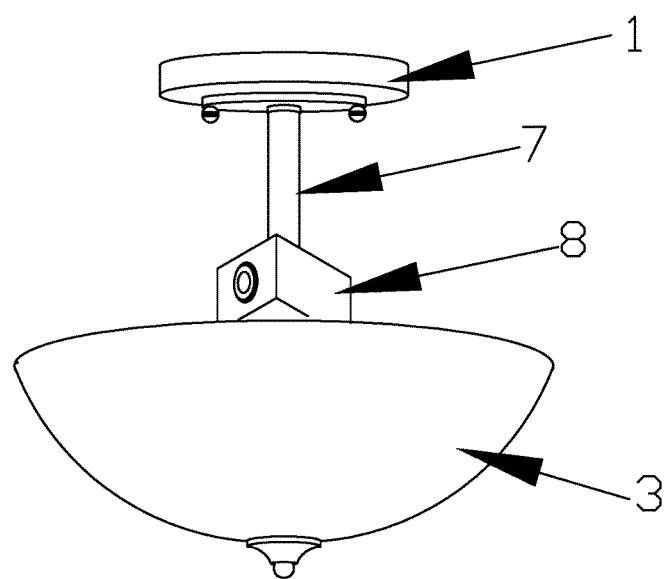
FIG. 1 is a perspective view of a first embodiment of the present invention.
Figure 2:
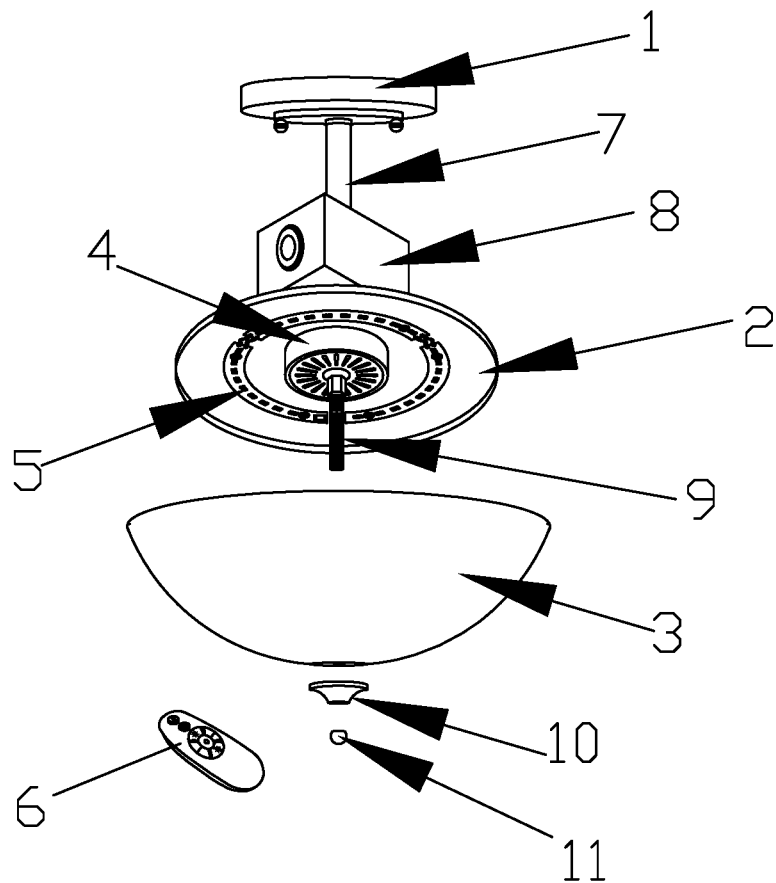
FIG. 2 is a partial exploded view of the first embodiment of the present invention.
Figure 7:
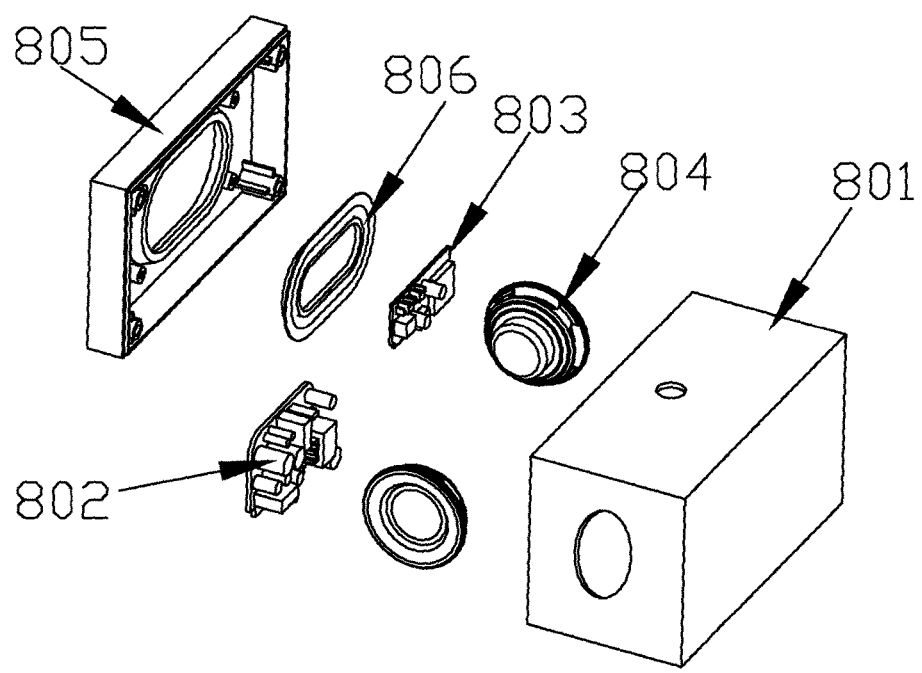
FIG. 7 is an exploded view of a Bluetooth amplifier of the present invention.

With reference to FIGS. 1, 2, and 7 for an LED lamp in accordance with the first embodiment of the present invention, the LED lamp is a semi-ceiling lamp with Bluetooth audio playback, dimming, and color temperature adjusting functions, and the LED lamp of this embodiment comprises a ceiling plate 1 and an LED light source component coupled to the ceiling plate 1, and the LED light source component comprises a lamp cover 3 and a support plate 2, and the LED light source component is formed by an LED panel 5 and a driver 4 for supplying low voltage power to the LED panel 5, and the LED panel 5 includes double color temperature LED lamp beads.

The driver 4 comprises a driving casing and a driving circuit board installed in the driving casing, and the driving circuit board comprises an input power cord, a high voltage input module, a wireless control module, a dimming module, a color temperature adjusting module, a transformer module, a low voltage output module and an output power line, wherein the high voltage input module is coupled to the input power line and the wireless control module, and the wireless control module is coupled to the dimming module and the color temperature adjusting module, and the wireless control module is provided for controlling the illumination brightness and the color temperature change of the double color temperature LED lamp beads, and the transformer module is coupled to the wireless control module and the low voltage output module, and the output power line is coupled to the low voltage output module, and the LED lamp further comprises an independent wireless remote control 6, and the wireless control module is provided for matching and controlling the wireless remote control 6 via a wireless connection.

The high voltage power is entered into the high voltage input module through the input power line, and the magnitude of input voltage is adjusted by the wireless control module, and the high voltage power is converted into a safe low voltage power by the transformer module, and then the safe low voltage power is outputted by the low voltage output module, and finally the low voltage power is sent to the LED panel 5 by the output power line.

A suspension part 7 is provided for connecting the ceiling plate 1 and the support plate 2, and a Bluetooth amplifier 8 is fixed and installed to a lower end of the suspension part 7, and a positioning rod is installed at a lower end of the suspension part 7, and the Bluetooth amplifier 8 has a longitudinal mounting hole penetrated through the Bluetooth amplifier 8, and the positioning rod is passed through the longitudinal mounting hole and fixed and coupled to the support plate 2, and the top of the positioning rod further has a pressing member for pressing the top of the Bluetooth amplifier 8 closely, so that the Bluetooth amplifier 8 is pressed and fixed to the top of the support plate 2 closely.

With reference to FIG. 7 for a Bluetooth amplifier 8 of this embodiment, the Bluetooth amplifier 8 comprises an amplifier casing 801, a drive power 802, a Bluetooth control board 803 and a speaker 804, and a longitudinal mounting hole is formed at the middle of the amplifier casing 801, and the speaker 804 is installed on a lateral side of the amplifier casing 801. In this embodiment, there are two speakers 804, and the amplifier casing 801 further comprises a casing cover 805 fixed by a screw and covered onto a lateral side of the amplifier casing 801, and a diaphragm 806 installed at the middle of the casing cover 805 for enhancing a bass effect.

In FIGS. 1 and 2, the suspension part 7 of this embodiment is a pillar structure, and the support plate 2 is a circular structure, and the bottom surface of the support plate 2 is a flat and smooth surface, and both LED panel 5 and driver 4 are installed to the bottom surface of the support plate 2, and the LED panel 5 is composed of three arc LED strips, and the double color temperature LED lamp beads are installed onto the bottom surface of each LED strip, and the LED strip is wound into a circular shape, and the driver 4 is disposed at the center of the circular LED strip, and a vertically and downwardly extended installing pillar 9 is installed at the middle of the support plate 2 and passed into the center of the driver 4, and the lamp cover 3 is an arc disc-shaped structure with an upward opening, and the installing pillar 9 is passed into the center of the lamp cover 3. In addition, a decorative cover 10 is installed to the bottom of the installing pillar 9 for providing an aesthetic appearance, and the bottom of the decorative cover 10 further has a decorative head 11 with a function of fixing and securing different components.

Embodiment 2

Figure 3:
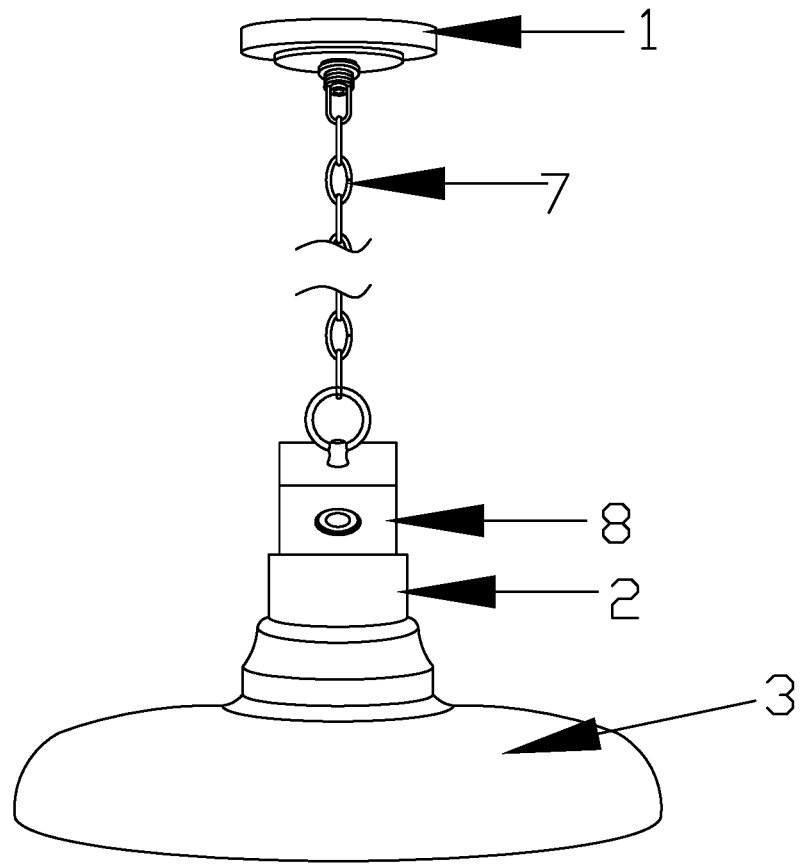
FIG. 3 is a perspective view of a second embodiment of the present invention.
Figure 4:
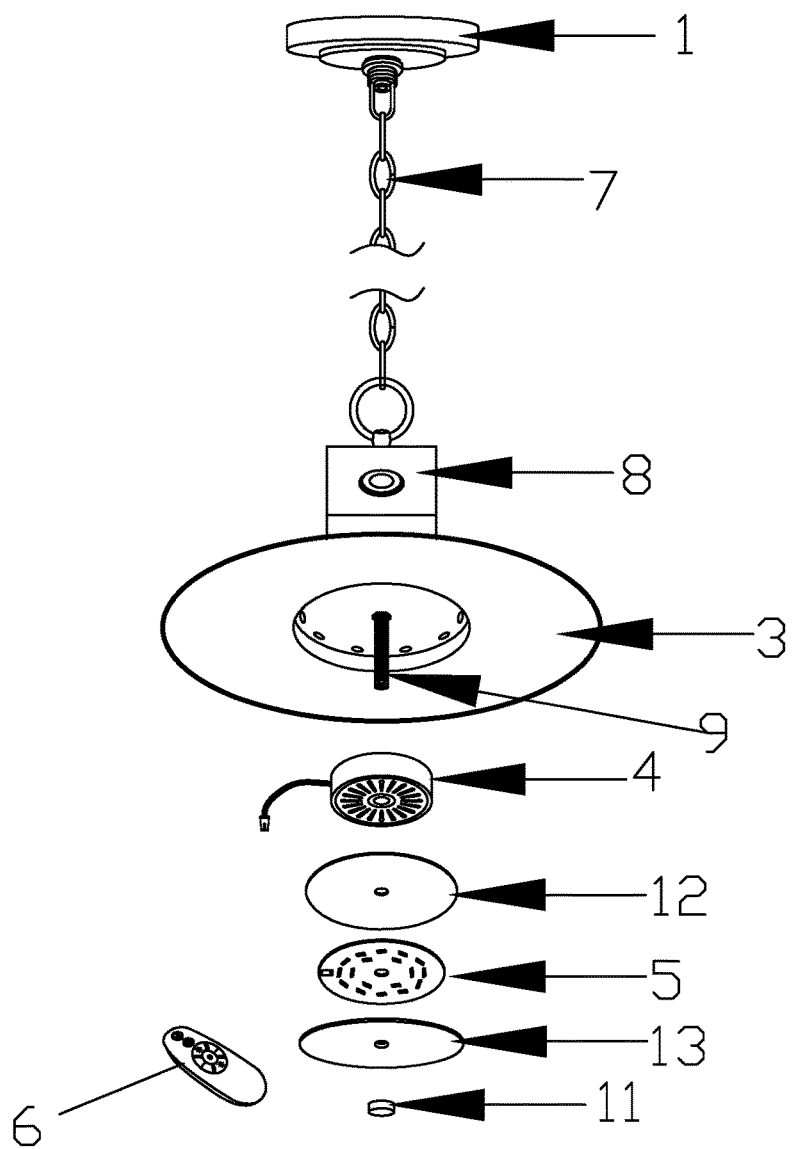
FIG. 4 is a partial exploded view of the second embodiment of the present invention.

With reference to FIGS. 3, 4 and 7 for an LED lamp of this embodiment, the LED lamp is a pendant lamp and the suspension part 7 is a hanging chain, and the support plate 2 is a cylinder structure installed at the top of the lamp cover 3, and the difference between the LED lamps of this embodiment and the previous embodiment resides on that the lamp cover 3 of this embodiment is a disc structure with a downward opening, and the middle of the top of the lamp cover 3 is protruded to form an accommodating chamber with a downward opening, and a vertically and downwardly extended installing pillar 9 is installed at the center of the top of the accommodating chamber, and the driver 4 is passed to the installing pillar 9 and fixed in the accommodating chamber, and the LED panel 5 is a circular disc shaped structure, and the double color temperature LED lamp beads are installed onto the bottom surface of the LED panel 5, and the LED panel 5 is passed into the installing pillar 9 and fixed to the bottom of the driver 4, and the LED panel 5 is disposed at the opening of the accommodating chamber, and the top edge of the accommodating chamber has a plurality of air convection holes, and a cooling plate 12 is installed between the driver 4 and the LED panel 5 and passed into the installing pillar 9, and the bottom of the LED panel 5 further has a light shield 13 passed into the installing pillar 9 and fixed by a fastener, and the bottom of the light shield 13 has a decorative head 11 fixed to the bottom of the installing pillar 9.

Embodiment 3

Figure 5:
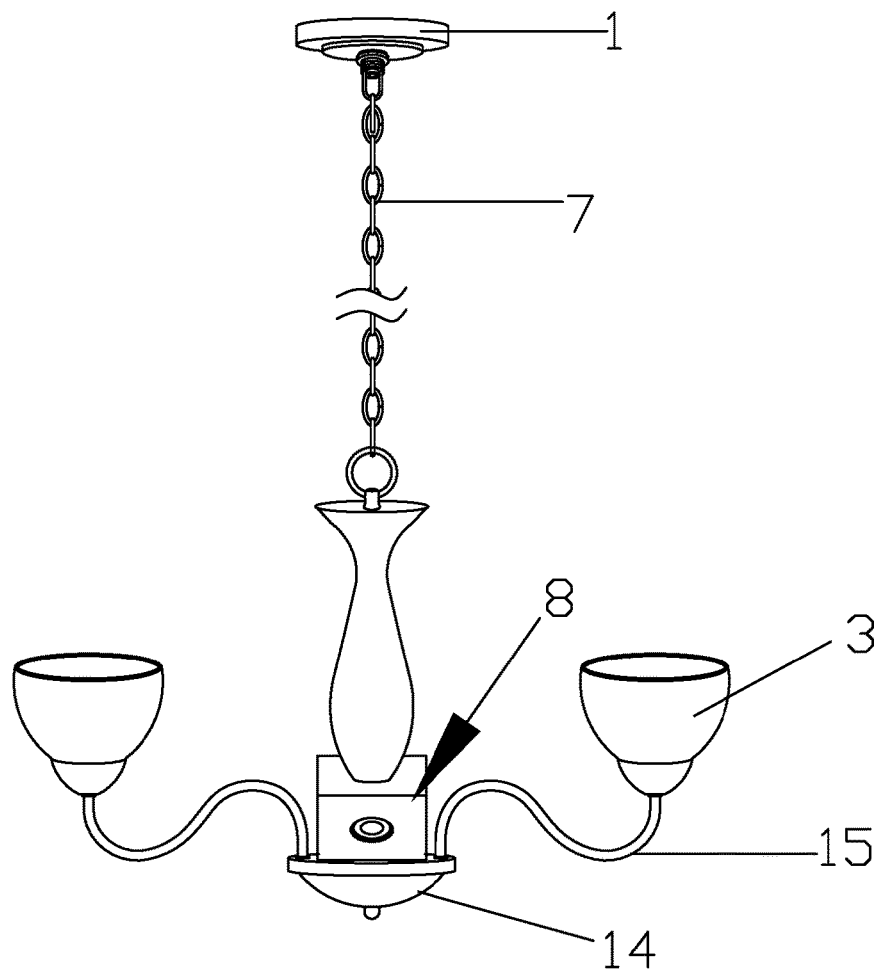
FIG. 5 is a perspective view of a third embodiment of the present invention.
Figure 6:
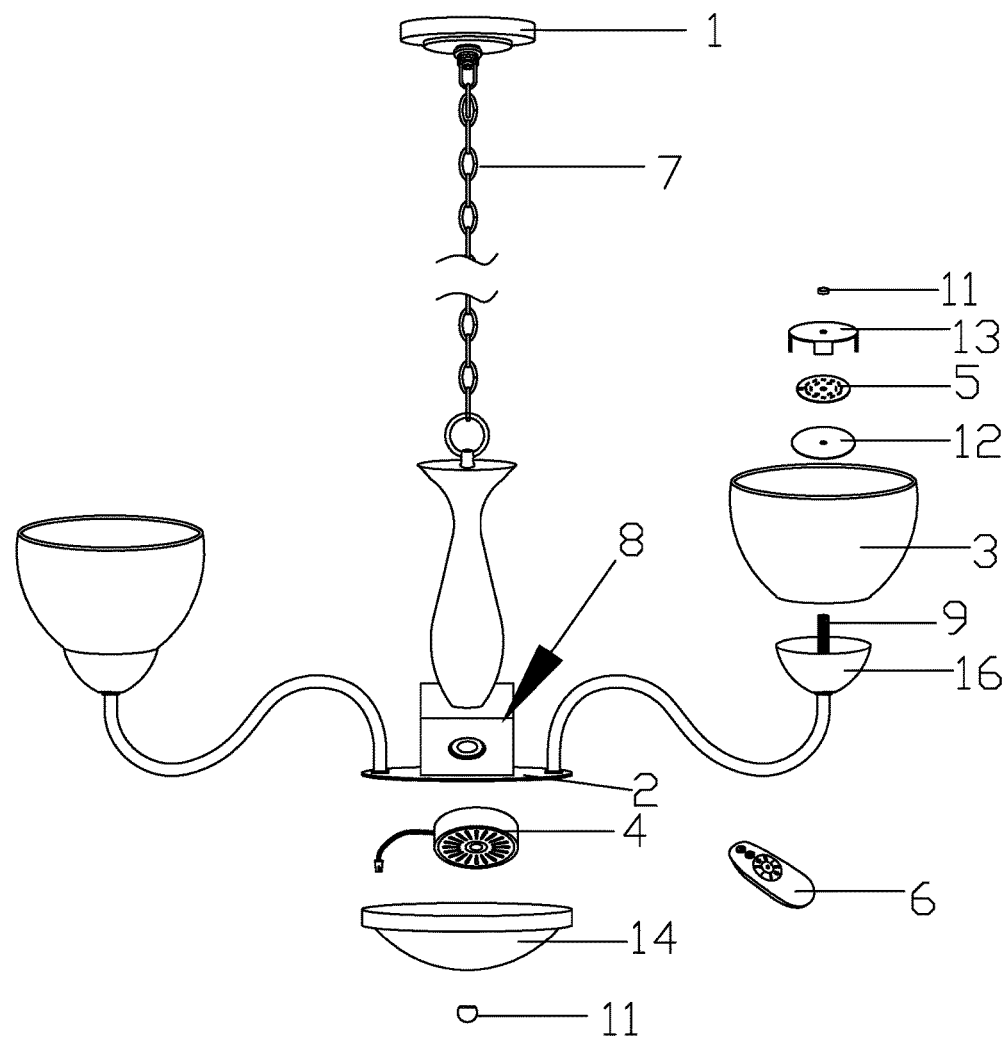
FIG. 6 is a partial exploded view of the third embodiment of the present invention.

With reference to FIGS. 5, 6 and 7 for an LED lamp of this embodiment, the LED lamp is a double head ceiling lamp, and the suspension part 7 is also a hanging chain, and the difference between the LED lamps of this embodiment and the first embodiment resides on that the support plate 2 is a circular structure, and the bottom surface of the support plate 2 is a flat and smooth surface, and the driver 4 is fixed and installed to the bottom surface of the support plate 2, and the bottom surface of the support plate 2 has a junction box cover 14 for covering the driver 4, and the bottom of the middle of the junction box cover 14 has a decorative head 11, and the support plate 2 is coupled to more than two bent supported rods 15, and an end of the support rod 15 is fixed to the support plate 2, and the other end of the support rod 15 has a lamp cup 16, a lamp cover 3 and a vertically and upwardly extended installing pillar 9, wherein the lamp cover 3 is a structure with an upward opening, and the installing pillar 9 is disposed at the center of the lamp cover 3, and the LED panel 5 is a circular disc shaped structure, and the double color temperature LED lamp beads are installed to the top of the LED panel 5, and the LED panel 5 is passed into the installing pillar 9, and the top of the LED panel 5 has a light shield 13 passed into the installing pillar 9, and the bottom of the LED panel 5 has a cooling plate 12 passed into the installing pillar 9, and the top of the light shield 13 has a decorative head 11 fixed to the top of the installing pillar 9.

The LED lamp has a Bluetooth amplifier 8 installed thereon, and the LED lamp is a ceiling lamp or a semi-ceiling lamp installed at a top position of a room, so that when the Bluetooth amplifier 8 plays music, the overall surround sound quality is better than the situation of putting the amplifier on a desk or a table. After the LED lamp is powered on, a mobile phone is turned on and connected to a Bluetooth option, so as to match the Bluetooth amplifier 8 of the present invention automatically and the mobile phone can play music automatically in a simple and convenient way. The LED lamp of the invention has the dimming function, the color temperature adjusting function, and the Bluetooth playback function via a mobile phone and the features of high LED light emitting efficiency and high color rendering index. The same model of lamps can satisfy different consumers' requirements.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

What is claimed is:
1. An LED lamp system comprising:
a ceiling plate;
a suspension part;
a Bluetooth amplifier;
an LED light source component;
the LED light source component being coupled to the ceiling plate;
the LED light source component comprising a lamp cover, a support plate, an LED panel and a driver;
the ceiling plate and the support plate being coupled to each other by the suspension part;
the Bluetooth amplifier being mounted and installed to a lower end of the suspension part;
the lower end of the suspension part forming a positioning rod;
the Bluetooth amplifier comprising a longitudinal mounting hole;
the positioning rod passing through the longitudinal mounting hole;
the positioning rod being fixed to the support plate;
the positioning rod comprising a pressing member at a top thereof;
the pressing member closely pressing against a top side of the Bluetooth amplifier, so as to closely pressing and fixing the Bluetooth amplifier to a top side of the support plate;
the driver being configured to supply a low voltage power to the LED panel;
the LED panel comprising double color temperature LED lamp beads;
the driver comprising a driving casing and a driving circuit board;
the driving circuit board being installed in the driving casing;
the driving circuit board comprising an input power line, a high voltage input module, a control module, a dimming module, a color temperature adjusting module, a transformer module, a low voltage output module and an output power line;
the high voltage input module being coupled to the input power line and the control module;
the control module being coupled to the dimming module and the color temperature adjusting module;
the control module being configured to control an illumination brightness and a color temperature change of the double color temperature LED lamp bead;
the transformer module being coupled to the control module and the low voltage output module;
the output power line being coupled to the low voltage output module;
in response to a high voltage power being entered into the high voltage input module through the input power line, the control module being configured to adjust a magnitude of said high voltage power;
in response to said magnitude of said high voltage power being adjusted by the control module, the transformer module being configured to convert the high voltage power into said low voltage power; and
in response to said high voltage power being converted into said low voltage power by the transformer module, the low voltage output module being configured to output said low voltage power to the LED panel through the output power line.

2. The LED lamp system according to claim 1 comprising:
the Bluetooth amplifier comprising an amplifier casing, a drive power, a Bluetooth control board and a speaker;
the longitudinal mounting hole being formed at a middle of the amplifier casing; and
the speaker being installed on a lateral side of the amplifier casing.

3. The LED lamp system according to claim 2 comprising:
a casing cover;
a screw;
a diaphragm;
the casing cover being fixed and covered onto the lateral side of the amplifier casing by the screw; and
the diaphragm being installed at a middle of the casing cover for enhancing a bass effect.

4. The LED lamp system according to claim 1 comprising:
a wireless remote control;
the control module being a wireless control module; and
the wireless remote control matching and controlling the wireless control module via a wireless connection.

5. The LED lamp system according to claim 1 comprising:
the driver comprising a male connector;
the male connector being installed at an end of the output power line;
the LED panel comprising a female connector; and
the male connector being matched and coupled to the female connector.

6. The LED lamp system according to claim 1 comprising:
the support plate being of circular-shaped;
the support plate comprising a bottom surface;
the bottom surface being flat and smooth;
the LED panel and the driver being installed onto the bottom surface of the support plate;
the LED panel comprising more than two arc LED strips;
the double color temperature LED lamp beads being installed onto a bottom surface of each of the more than two arc LED strips;

more than two arc LED strips being wound to form a circular shape; and the driver being disposed at a center of the circular shape of the more than two arc LED strips.

7. The LED lamp system according to claim 1 comprising:

an installing pillar;

a decorative cover;

the installing pillar being vertically and downwardly extended;

the installing pillar being installed at a middle of the support plate;

the installing pillar passing into a center of the driver;

the lamp cover being of arc disc-shaped;

the lamp cover comprising an upward opening;

the installing pillar passing into a center of the lamp cover; and the decorative cover being installed at a bottom of the installing pillar for fixing the lamp cover.

8. The LED lamp system according to claim 1 comprising:

an installing pillar;

the lamp cover being of disc-shaped;

the lamp cover comprising an accommodating chamber and a downward opening;

the accommodating chamber being formed by a middle of a top portion of the lamp cover being protruded;

the downward opening being formed at the accommodating chamber;

the installing pillar being vertically and downwardly extended;

the installing pillar being installed at a center of a top of the accommodating chamber;

the driver passing into the installing pillar;

the driver being fixed in the accommodating chamber;

the LED panel being of circular disc-shaped;

the double color temperature LED lamp beads being installed at a bottom surface of the LED panel;

the LED panel is passing into the installing pillar;

the LED panel being fixed to a bottom of the driver; and the LED panel being disposed at the downward opening of the accommodating chamber.

9. The LED lamp system according to claim 8 comprising:

a plurality of air convection holes;

a cooling plate;

a light shield;

a fastener;

the plurality of air convection holes being formed at a top edge of the accommodating chamber;

the cooling plate being installed between the driver and the LED panel;

the cooling plate passing into the installing pillar;

the light shield being installed under the LED panel;

the light shield passing into the installing pillar; and the light shield being fixed by the fastener.

10. The LED lamp system according to claim 1 comprising:

a junction box;

a bent supported rod;

a lamp cup;

an installing pillar;

a light shield;

a cooling plate;

the support plate being of circular-shaped;

the support plate comprising a bottom surface;

the bottom surface being flat and smooth;

the driver being fixed and installed to the bottom surface of the support plate;

the junction box cover being disposed at the bottom surface of the support plate for covering the driver;

the support plate being coupled to the bent supported rod;

the bent support rod comprising two ends respectively fixed to the support plate and the lamp cup;

the installing pillar being vertically and upwardly extended;

the lamp cover comprising an upward opening;

the installing pillar being disposed at a center of the lamp cover;

the LED panel being of circular disc-shaped;

the double color temperature LED lamp beads being uniformly installed to a top of the LED panel;

the LED panel passing into the installing pillar;

the light shield being installed at the top of the LED panel;

the cooling plate being installed at a bottom of the LED panel; and the cooling plate passing into the installing pillar.

\* \* \* \* \*